United States Patent [19]

Barker et al.

[11] Patent Number: 4,703,321

[45] Date of Patent: Oct. 27, 1987

[54] METHOD FOR EDITING A GRAPHIC OBJECT IN AN INTERACTIVE DRAW GRAPHIC SYSTEM

[75] Inventors: Barbara A. Barker, Round Rock; Irene H. Hernandez, Austin, both of Tex.

[73] Assignee: International Business Machines Corporation, Armonk, N.Y.

[21] Appl. No.: 781,621

[22] Filed: Sep. 30, 1985

[51] Int. Cl.[4] ............................................... G09G 1/14
[52] U.S. Cl. .................................... 340/747; 340/731; 340/751; 340/724
[58] Field of Search ............... 340/747, 731, 706, 707, 340/709, 710, 723, 724, 727, 751

[56] References Cited

U.S. PATENT DOCUMENTS

| 4,127,349 | 11/1976 | Okor | 340/747 |
|---|---|---|---|
| 4,555,699 | 11/1985 | Citron et al. | 340/706 |
| 4,559,533 | 12/1985 | Bass et al. | 340/747 |
| 4,586,036 | 4/1986 | Thomason et al. | 340/747 |
| 4,622,545 | 11/1986 | Atkinson | 340/734 |

OTHER PUBLICATIONS

Kaehler et al.—"Macpaint TM", Apple Computer Corp. 1983.
"Diagraph", Computer Support Corp. 1984, pp. 22–25.
"The Lisa Computer System"—Gregg Williams, Byte Publication—Feb. 1983—pp. 33–50.
Casale et al.—"An Overview of Analytic Solid Modeling" IEEE Computer Graphics & Applications—Feb/1985, pp. 45–56.
A. McCaskill and J. S. Wang—"Adding a Joint into a Graphic Object"—IBM Technical Disclosure Bulletin—vol. 27, No. 10B, Mar. 1985, pp. 6055–6056.
A. McCaskill and J. S. Wang—"Relocating the Joint of a Graphic Object"—IBM Technical Disclosure Bulletin—vol. 27, No. 10B, Mar./1985—p. 6052.

Primary Examiner—Gerald L. Bigance
Assistant Examiner—Mahmoud Fatahi-Yar
Attorney, Agent, or Firm—Richard E. Cummins; James H. Barksdale, Jr.

[57] ABSTRACT

A method for editing graphic objects in an interactive draw graphic system, in which the operator is allowed to select one of two editing modes which results in a graphic object being either redefined or remaining as is when a graphical editing action is applied only to a portion (sub-object) of the object. In the REDEFINE mode, the graphic editing action e.g., stretch, shrink, scale down, rotate, etc., applied to a sub-object results in the line segments of the object that are attched to the ends of the sub-object to be redrawn or "rubberbanded" as the sub-object is edited (moved). In the AS-IS mode only the sub-object is affected by the graphic editing action and the rest of the object is not altered.

7 Claims, 18 Drawing Figures

```
┌─────────────┐        ┌─────────────┐       ┌─34──────┐
│  30         │        │  32         │       │        ╲ ╱─37
│  SELECTED   │        │  SELECTED   │       │SELECTED─>
│  SIDE  ──>  │        │  SIDE  ──>  │─33    └──────────╲
└─────────────┘        └─────────────┘
```

SHRINK                 SHRINK                 SHRINK
DIRECTION              ASIS                   REDEFINE
DOWN        ↓

FIG. 3a                FIG. 3b                FIG. 3c

```
┌─────────────┐        ┌─────────────┐       ┌─47
│  40         │        │  42         │      ╱44      ╲
│  SELECTED   │        │  SELECTED   │─43  │SELECT.  >─45
│  SIDE  ──>  │        │  SIDE  ──>  │      │SIDE─>  ╱
└─────────────┘        └─────────────┘       ╲──────46
```

SCALE DOWN             SCALE DOWN             SCALE DOWN
                       ASIS                   REDEFINE

FIG. 4a                FIG. 4b                FIG. 4c

```
                                                 57╲
┌─────────────┐        ┌─────────────┐─53   ╱──────────╲
│  50         │        │  52         │     │ 54         ╲
│  SELECTED   │        │  SELECTED   │     │ SELECT.    │
│  SIDE  ──>  │        │  SIDE  ──>  │     │ SIDE───>   │
└─────────────┘        └─────────────┘      ╲──56──────╱
```

SCALE UP               SCALE UP               SCALE UP
                       ASIS                   REDEFINE

FIG. 5a                FIG. 5b                FIG. 5c

```
┌─────────────┐        ┌─────────────┐       ┌────────────67
│  60         │        │  62         │       │64      ╱
│  SELECTED   │        │  SELECTED   │       │SELECT.╱
│  SIDE  ──>  │        │  SIDE  ──>  │       │SIDE──╱──>
└─────────────┘        └──────66──63─┘       └──66──65
```

ROTATE                 ROTATE 90 DEGREES      ROTATE 90 DEGREES
                       ASIS                   REDEFINE

FIG. 6a                FIG. 6b                FIG. 6c

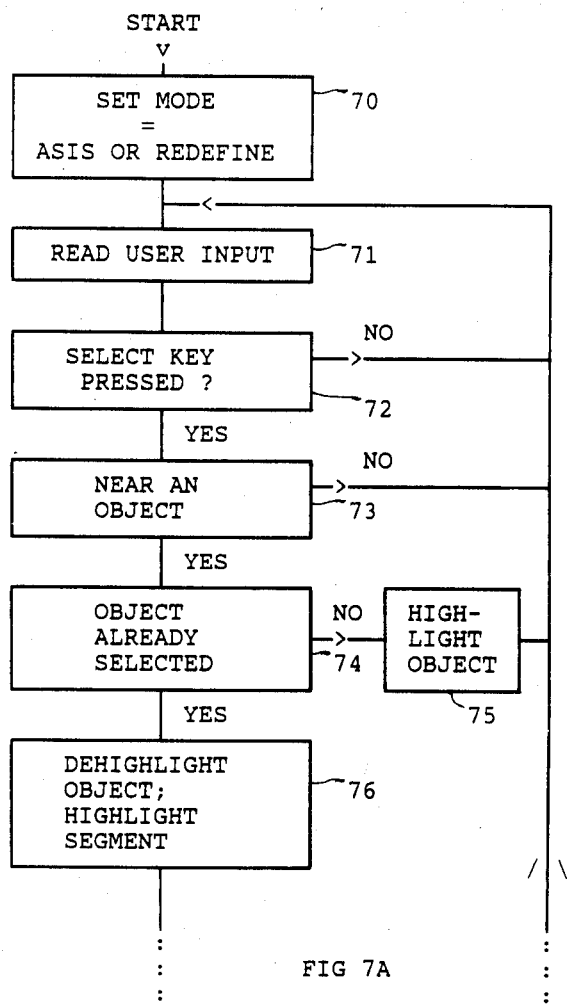

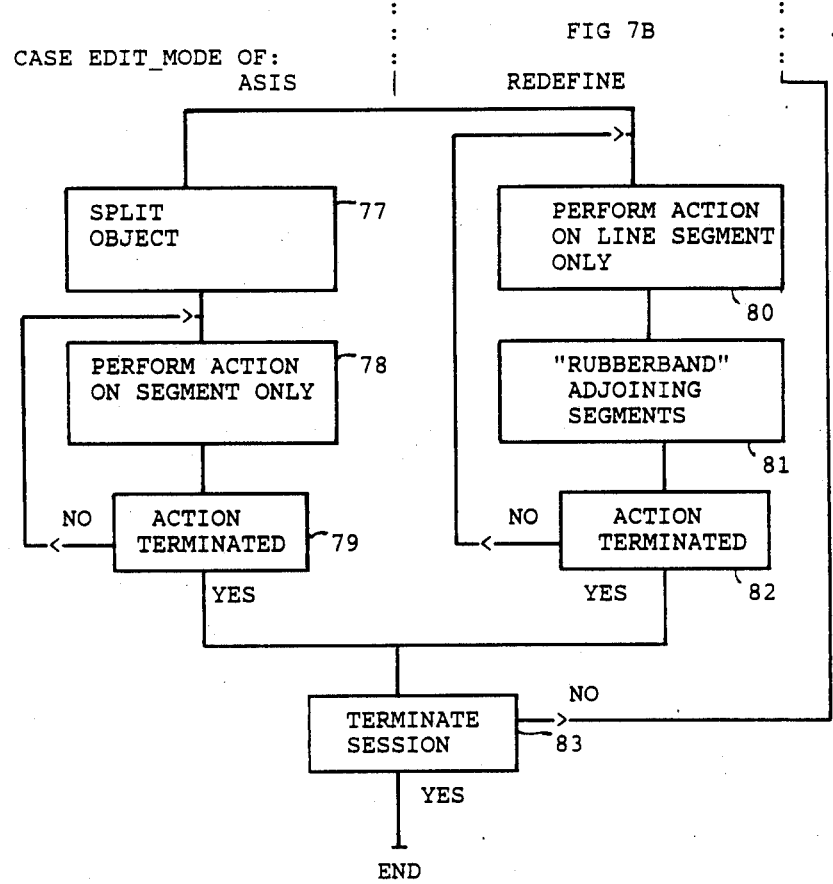

METHOD FOR EDITING A GRAPHIC OBJECT IN AN INTERACTIVE DRAW GRAPHIC SYSTEM

TECHNICAL FIELD

This invention relates in general to interactive draw graphic systems, and in particular, to an improved method of editing graphic objects in which the operator is allowed to pre-select the effect that an editing action on a sub-object will have on the whole object.

BACKGROUND ART

The prior art has disclosed various interactive draw graphic arrangements in which a graphic object may be created and edited, e.g., modified by an operator following a sequence of interactions with the systems. These systems generally include an all-points addressable display device which functions to display on its screen, graphic object creating actions or editing actions that the operator has selected and entered into the system by means of a keyboard or a mouse.

Interactive draw graphic systems may be physically packaged as a dedicated type stand-alone work station or as a group of separate, cable-connected personal computer system components that is executing a draw graphics program.

Most all prior art interactive draw graphic systems provide the operator with the ability to edit a graphic object once it has been created. The typical graphic editing actions provided by prior art systems include move, copy, rotate, stretch, shrink, scale up or down, and delete or erase. In the process of editing an object, the operator must select the particular editing action and for editing actions such as move, rotate, and scale the operator must also provide a distance value and direction to the system. In addition, in some more sophisticated draw graphic arrangements, the operator is provided with the ability to select a particular object from a group of individual objects that are displayed in an overlaid fashion on the screen.

The manner in which these interactive steps are implemented in the system is sometimes referred to as the operator interface and it is this interface that determines if the particular graphic application is "user friendly" which is of paramount importance in the personal computer market.

Some prior art systems permit the graphic editing actions that are available for editing complete graphic objects to also be used to edit a sub-object. The term sub-object refers to a part of a graphic object. This part or segment exists between two defined points which are included in the definition of the main object. The end points of the sub-object may or may not be connected to another segment. If the object is a closed object, then the end points of each sub-object are connected. If, on the other hand, the object is open, then at least one of the end points is not connected.

A "joint" or a vertex is formed when two end points of different sub-objects are interconnected.

The ability of the system to edit sub-objects is important to the operator's efficiency, since it means that the object does not have to be redrawn. Prior art sub-object graphic editing systems are somewhat limited in the kind of editing actions that are permitted once the sub-object has been selected. In these systems, movement of the sub-object, causes the line segments that are attached to the end points of the moving sub-object to "rubber-band." For example, if the subject object is the right side of a square and the movement of the sub-object is to the right in a generally horizontal direction, the square is changed to a rectangle. If, on the other hand, the sub-object is moved vertically, the square is changed to a parallelogram. Similar type "rubber-banding" actions occur with other editing actions and other type objects.

The rubber-banding action occurs because the system has defined all of the sub-objects that define the main object as line segments between two points, each of which is represented by an x, y coordinate. If the point is moved by the editing action on a sub-object, the system redefines the end points for the sub-object and also for the attached line segments. If the operator merely wants to modify the appearance of the sub-object and not the total object, he must erase the sub-object and re-draw it. This is not very efficient from the operator standpoint and could be very frustrating if the sub-object is overlaid with a number of other graphic objects, since it is quite easy to erase the wrong lines in the erasing process.

Co-pending U.S. application Ser. No. 710,762 entitled "Method of Manipulation of Graphic Sub-Objects in an Interactive Draw Graphic System filed on Mar. 11, 1985 and assigned to the assignee of the present invention is directed to a method in which the operator is provided with a choice of whether or not the entire object should be modified when a sub-object is being modified. That method involves the step of assigning a binary attribute to the end points of the sub-object to be modified that determine if each vertex corresponding to each end point of the sub-object can be "broken" or separated or whether it is to "stay attached." If the operator chooses to have the vertices break, the operator controls which one or both vertices break by where along the length of the sub-object it is selected. For example, in that arrangement, if the vertices are assigned to break and the operator selects the object in the middle third, then both vertices break as the sub-object segment is moved. If, however, the sub-object is selected at either of its end third portions, then the sub-object is merely rotated around the opposite vertex. In either case, the remaining portion of the object is not affected. If the operator elects to have the vertices not break, but stay attached as the sub-object is moved, then any editing action on the sub-object affects the shape and appearance of the overall object, in that the line segments attached to the ends of the sub-object are redrawn by the system in a "rubber-banding" action.

Such an arrangement operates satisfactorily in most situations. However, where sub-objects are relatively short, it is sometimes difficult for the operator to implement a control action involving the selection of a desired third of the sub-object. The present invention avoids the above problem.

SUMMRY OF THE INVENTION

In accordance with the method of the present invention, two options for graphic editing actions on sub-objects are provided. The first option, when selected by the operator keeps the original shape of the object and only changes the edited sub-object. The second option alters the original shape of the object by re-drawing the segments that connect with the ends of the edited part, i.e., in a so-called "rubber-banding" action. The first option is referred to as "ASIS," while the second option is referred to as "REDEFINE." The operator either has the option to select whether the object should retain its original shape with only the part that has been edited changed, or whether the object should be re-defined by re-drawing the segments that originally connected to the ends of the edited sub-object.

It is therefore an object of the present invention to provide an improved method for editing graphic objects in an interactive draw graphic system.

A further object of the present invention is to provide an improved method for editing a graphic sub-object in an interactive draw graphic system in which the operator can select whether the object containing the sub-object will be REDEFINED or stay ASIS as a result of the sub-object editing action.

Objects and advantages, other than those mentioned above, will become apparent from the following description when read in connection with the drawing.

BRIEF DESCRIPTION OF THE DRAWING

FIGS. 3a-3c illustrate the effect of a "SHRINK" editing action for both options.

FIGS. 4a-4c illustrate the effect of the "SCALE-DOWN" editing action for both options.

FIGS. 5a-5c illustrate the effect of the "SCALEUP" editing action for both options.

FIGS. 6a-6c illustrate the effect of a "ROTATE" editing action for both options.

FIGS. 7a and 7b is a flow chart, setting forth the various steps in the method.

DESCRIPTION OF THE PREFERRED EMBODIMENT

Figure 1:
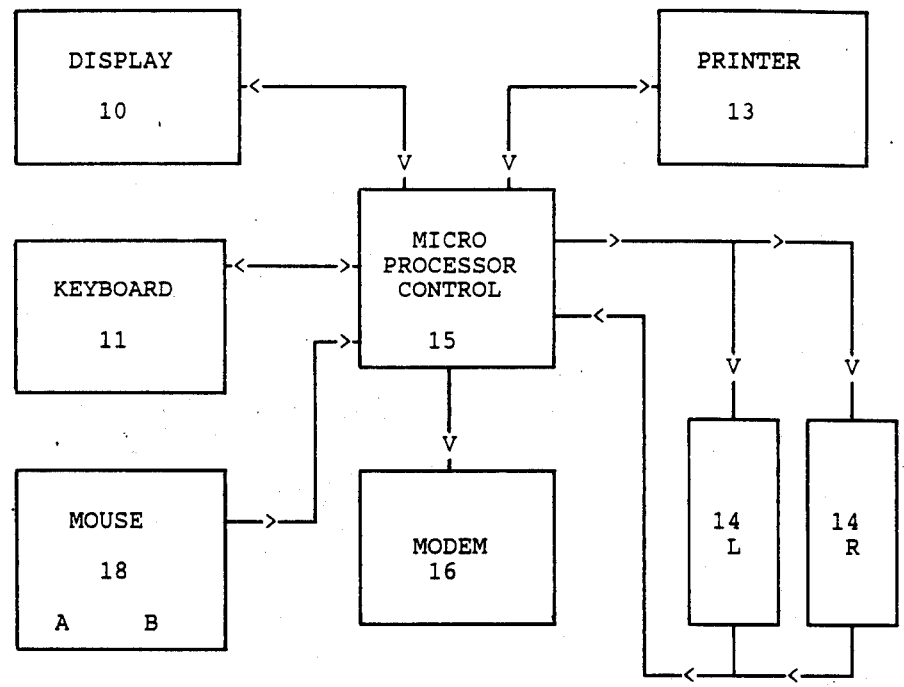
FIG. 1 illustrates in block diagram form, a typical interactive draw graphic system.

FIG. 1 illustrates the general arrangement of a typical interactive draw graphics system. The system shown comprises a display device 10 for displaying information to the operator, a keyboard 11 which the operator uses to enter information including commands and data into the system, a printer 13 which functions to provide hard copy output of information generated by the system and selected by the operator, a pair of diskette drives, 14L and 14R which function to transfer information between the system and the magnetic storage diskettes that are removably associated with the diskette drives and which store both program information, text information, and graphic information. System components 10, 11, 13, 14L, and 14R are connected, as shown in FIG. 1, to the microprocessor Block 15 which functions as the overall control for the system and interconnects the various system components to perform their specific function at the appropriate time. The system of FIG. 1 also includes a modem 16 which functions to interconnect that system to other systems through various communication links.

Since the system of FIG. 1 is adapted to process graphic applications such as interactive draw type application programs, it should be assumed that the display device 10 is an all-points addressable type graphic display device in which each individual picture element (PEL) may be addressed, in contrast to a text-type display where only a character box is addressable. Since interactive draw graphic applications are to be run by the system, an auxiliary input device 18 is also provided for permitting more rapid positioning of the cursor on the screen than might be obtainable by the cursor positioning keys on the keyboard 11. Such devices are well known in the art, and for purposes of this description, it will be assumed that device 18 is a conventional "mouse" equipped with two buttons or keys, 18A and 18B. Devices such as a data tablet, having similar functions to the mouse, could also be employed for input device 18.

It should be assumed that the system of FIG. 1 is provided with a suitable interactive draw graphic type program which permits the operator to draw graphics objects on the screen of device 10, similar to the objects shown in FIG. 2 which illustrates a display screen having rectangularly shaped objects 20, 22, and 24.

It should be further assumed that an option is provided prior to editing of the graphic objects which allows the operator to set the default graphics editing mode. This graphics editing mode can be set to ASIS or REDEFINE. In the preferred embodiment the option is preferably established as one of the system defaults at the time the draw graphic program is initially installed in the system of FIG. 1 and provision is included in the program to enable that default to be changed at some subsequent time if the operator so desires. If the current editing mode is ASIS, the system manipulates the selected sub-object only without modifying the other parts of the original object. If the current editing mode is REDEFINE, the system manipulates the selected sub-object and reconfigures the original objects so that the adjoining sides remain attached to the manipulated sub-object.

It should also be understood, that in the following description the function of selecting the graphic object to be edited is not described, but that editing the sub-object is, by definition, a sub-set function of the main object editing function. The following description describes, in connection with FIGS. 2, 3, 4, 5, and 6, the different results that occur for objects and depending on the action which is occurring and the graphic editing mode in effect. In this regard, the selection of the sub-object is in accordance with the well known approach of positioning a pointing cursor adjacent the sub-object and operating either a mouse key or keyboard key, having the function of advising the system that the closest object is the one that is selected.

Figures 2A, 2B, 2C:
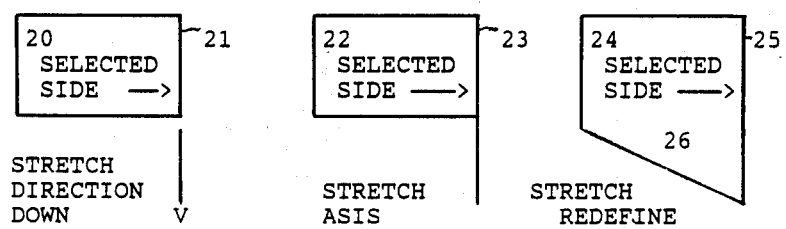
FIGS. 2a-2c illustrate the effect of a "stretch" editing action for both options.

Objects 20, 22, and 24 in FIGS. 2a-2c represent rectangles previously created by the operator using a cursor locating device. As mentioned previously, the locating device can be a mouse, keyboard, etc. FIG. 2 illustrates what happens when the operator selects the line segment 21 and applies the stretch action. In object 22, since the editing mode is assigned to be ASIS, only the selected line segment 23 stretches and changes shape, leaving the remaining part of the object unaltered. However, in FIG. 2c, since the editing mode is assigned to be REDEFINE, line segment 25 remains attached to sub-object 26, redefining the shape of the object 24. The entire object changes shape to keep up with the movement of the line segment 25, which results from the operator moving the mouse.

FIGS. 3, 4, 5, and 6 illustrate the results of applying various actions to sub-object 21 of object 20 with differing results depending on the current graphic editing mode.

In FIG. 3b, sub-object 33 is selected and the shrink function causes only side 33 to shrink the remaining portions of object 32 remain unaffected, since the ASIS option was selected.

In FIG. 3c, the object 34, particularly sub-object 37, is redrawn as a result of the SHRINK editing action on line 35 and the selection of the REDEFINE option.

In FIG. 4b, the SCALEDOWN editing action is applied to side 43 of object 42. The SCALEDOWN function operates to shrink the ends an equal amount whereas the shrink action of FIG. 3 requires a direction towards which the shrink action occurs. The sub-object 43 is the only line affected with the ASIS option in operation. However, as shown in FIG. 4c, both line segments 46 and 47 are redrawn when the REDEFINE option is in effect and sub-object 45 is scaled down.

FIGS. 5a-5c are similar to 4a-4c except that the SCALEUP editing action is depicted.

In FIGS. 6a-6c, the effect of the ROTATE editing action is illustrated for both options.

The various steps in editing the sub-objects described in connection with FIGS. 2-6 are now described with the flow chart of FIG. 7.

When the application is initiated, the type of graphics editing mode in effect is initialized as shown in Block 70. The mode is the system default or the system default as changed by the operator after system initialization.

To begin the editing interaction, assume that the operator has obtained a pointer or cursor. The operator then moves the pointer on the display screen by means of a locater device, such as a mouse. During the movement of the mouse, the application is reading the locator device for movement of the pointer or pressing of the mouse keys (buttons). The reading of the location device is depicted in Block 71.

When the application detects that a mouse key has been pressed, a check is made to determine if the key is the Object Select Key as shown in Block 72. If the Object Select Key has been pressed, then the application checks to see if the pointer is within selecting range of any graphic object. This is shown in Block 73. If the application determines that the pointer is not close enough to any object to select, the application continues to read the locator device for operator input.

If the pointer is close enough to an object to select it, the application then determines if that object has already been selected, as shown in Block 74. If the object has not been selected, then the application highlights the object as shown in Block 75, and waits for further operator input. The operator, at this point, can do a range of actions on the object, but these are not the subject of this invention. If the selected object is already selected, then the operator is trying to select a portion of the object. Therefore, the segment pointed to by the locator device is highlighted and the rest of the object de-highlighted as shown in Block 76.

Now that the segment has been selected, the application must determine what graphics editing mode is in effect. If the ASIS editing mode is in effect, the selected sub-object is broken into two objects so that the sub-object can be manipulated independent of the rest of the object. This is shown in Block 77. In Block 78, the application carries out whatever action the operator had previously specified. The action to be performed is specified by the operator, either through implicit action editing or through a menu interface presented to the operator by the application. The action is applied until the operator terminates the action as shown in Block 79.

If the REDEFINE editing mode is in effect, the action is performed on the segment as shown in Block 80. In addition, as the action is being performed on the segment, the application is also "rubber-banding" the adjoining segments to keep up with the movement of the sub-object as shown in Block 81. The action to be performed is specified by the operator, either through implicit action editing or through a menu interface presented to the operator by the application. Editing in this mode has the effect of changing the appearance of the entire object. The action is applied until the operator terminates the action as shown in Block 82.

The application continues to monitor for operator input until the session is terminated as shown in Block 83.

An illustration of an application program useable by the processor of FIG. 1 for causing a sub-object to be manipulated either ASIS or in a REDEFINE graphics editing mode during interactive graphics follows. This program is in program design language from which source and machine code are derivable. It is to be assumed that the system is under mouse and keyboard control. The mouse controls the movement of a visible pointing cursor which allows the operator to determine the current cursor position on the screen.

```
REPEAT
   CALL GET_MODE (G_EDIT_MODE)
   CALL READ_INPUT_DEVICE (SELECT_KEY_TYPE, X, Y)
   IF SELECT_KEY_TYPE = OBJECT_SELECT_KEY THEN
      CALL FIND_OBJECT (X, Y, OBJECT_PTR)
      IF OBJECT_PTR < > NIL THEN
         IF NOT OBJECT_SELECTED (OBJECT_PTR) THEN
            CALL HIGHLIGHT_OBJECT (OBJECT_PTR)
         ELSE
            CALL DEHIGHLIGHT_OBJECT (OBJECT_PTR)
            CALL FIND_SEGMENT (OBJECT_PTR, X, Y, _SEGMENT)
            CALL HIGHLIGHT_OBJECT (_SEGMENT)
            CASE G_EDIT_MODE OF
               ASIS:
                  CALL BREAK_OBJECT (_SEGMENT, OBJECT_PTR)
                  CALL GET_ACTION_TYPE (ACTION_TYPE)
                  REPEAT
                     CALL READ_INPUT_DEVICE (SELECT_KEY_TYPE, X, Y)
                     CALL G_OBJECT_EDIT (ACTION_TYPE, _SEGMENT, X, Y)
                  UNTIL SELECT_KEY_TYPE = ACTION_COMPLETE
               REDEFINE:
                  REPEAT
                     CALL READ_INPUT_DEVICE (SELECT_KEY_TYPE, X, Y)
                     CALL G_SUBOBJECT_EDIT (ACTION_TYPE, _SEGMENT, Y, Y)
                     CALL G_RUBBERBAND (_SEGMENT,OBJECT_PTR)
                  UNTIL SELECT_KEY_TYPE = ACTION_COMPLETE
            ENDCASE
```

-continued

```
      ENDIF
    ENDIF
  ENDIF
UNTIL SELECT_KEY_TYPE = SESSION COMPLETE
```

Description of the Pseudo Code

The following is an explanation of the program. The application calls a routine (CALL GET_MODE) to determine the current graphics editing mode prior to interactive graphics editing. Once the mode is determined, the application calls a routine to query the mouse input device to determine if a mouse key has been pressed (CALL READ_INPUT_DEVICE). READ_INPUT_DEVICE will return the selected mouse key and current X and Y location of the pointing cursor. If the OBJECT_SELECT_KEY is pressed, a routine is called (CALL FIND_OBJECT) to determine if the X and Y location returned from READ_INPUT_DEVICE is currently pointing to a graphic object, for example, a circle. If the operator was not pointing at any object, then the application returns to READ_INPUT_DEVICE to continue reading operator input.

If the operator pointed to a graphic object, the application calls a routine to determine if the object is already selected by calling the function OBJECT_SELECTED. If the object is not already selected, the object is highlighted (CALL HIGHLIGHT_OBJECT). If the object is already selected, then the operator is trying to select part of the object, namely a segment. Therefore, the object must be de-highlighted (CALL DEHIGHLIGHT_OBJECT). The application then calls a routine (CALL FIND SEGMENT) to get a handle on the segment being pointed to, and a routine to highlight that segment (CALL HIGHLIGHT_OBJECT).

Next, the application determines which graphics editing mode is in effect (CASE G_EDIT_MODE). If the graphics editing mode is ASIS, a routine is called (CALL BREAK_OBJECT) to break the selected segment from the rest of the object in order to manipulate the segment independently. The application also calls a routine to determine the current active action (CALL GET_ACTION_TYPE). The application then continues to monitor for operator input (CALL READ_INPUT_DEVICE) and calls a routine to interactively edit the segment (CALL G_OBJECT_EDIT) according to the ACTION_TYPE parameter. This process is repeated until the editing of the segment is complete (UNTIL ACTION_COMPLETE).

If the graphics editing mode is REDEFINE, the application continues to monitor for operator input and calls a routine to interactively edit the segment (CALL G_SUBOBJECT_EDIT) according to the ACTION_TYPE parameter. Since the segment is still attached to the rest of the object, a routine is called (CALL G_RUBBERBAND) to rubber-band the adjoining segments as the segment is manipulated. This process is repeated until the editing of the segment is complete (UNTIL ACTION_COMPLETE).

Processing continues until the operator terminates the graphics editing session (SELECT_KEY_TYPE=SESSION COMPLETE).

While the invention has been particularly shown and described with reference to the preferred embodiment thereof, it will be understood by those persons skilled in the art that various changes in the form and details may be made without departing from the scope and spirit of the invention.

We claim:

1. A method for editing a sub-object of a graphic object displayed in an interactive draw graphic system in which said object has at least one pair of selectable segment sub-objects which are interconnected at a common point, said method including the steps of
    (a) selecting either a first editing mode in which a graphical editing action on said sub-object causes said object to be redefined in accordance with the movement of said sub-object or a second editing mode in which said graphical editing action on said sub-object affects only said sub-object, and
    (b) graphically editing said sub-object.

2. The method recited in claim 1 in which said graphic object comprises at least two selectable segment sub-objects, each of which has at least one end connected to one end of another sub-object and further including the step of selecting one of said sub-objects in the step of graphically editing said selected sub-object.

3. The method recited in claim 2 in which said graphic object is a closed object having a plurality of sides, each of which is a selectable segment sub-object, and said step of selecting said first mode to cause said object to be redefined when said selected sub-object is graphically edited.

4. The method recited in claim 3 in which said step of graphically editing said selected sub-object involves changing the length of said one side which also results in a change in length of at least one of the two sides that adjoin the selected sub-object.

5. The method recited in claim 3 in which said change of length of said one side results in a change of length for said two sides that adjoin the selected sub-object.

6. The method recited in claim 5 in which said step of editing said sub-object results in equal changes of length for both said two sides that adjoin.

7. The method recited in claim 2 in which said graphic object is a closed object having a plurality of sides, each of which is a selectable segment sub-object and said step of selecting said second mode to cause said object to remain "As-Is" except for the editing actions to said selected sub-object.

* * * * *